United States Patent [19]

Rice

[11] Patent Number: 5,334,639
[45] Date of Patent: Aug. 2, 1994

[54] STARCH OIL SIZING COMPOSITION AND GLASS FIBERS TREATED THEREWITH

[75] Inventor: William B. Rice, Davidson County, N.C.

[73] Assignee: PPG Industries, Inc., Pittsburgh, Pa.

[21] Appl. No.: 15,071

[22] Filed: Feb. 8, 1993

Related U.S. Application Data

[63] Continuation of Ser. No. 828,046, Jan. 30, 1992, abandoned.

[51] Int. Cl.$^5$ .................. C08L 3/00; C08L 91/06; C08L 91/00; C08K 5/24
[52] U.S. Cl. ......................... 524/47; 524/50; 524/52; 524/275; 524/313; 524/376; 524/487; 524/262; 524/265; 428/391; 428/394
[58] Field of Search ............... 524/50, 52, 275, 313, 524/376, 487, 262, 265; 428/391, 394

[56] References Cited

U.S. PATENT DOCUMENTS

| | | | |
|---|---|---|---|
| 2,200,815 | 5/1940 | Ackley | 260/309 |
| 2,267,965 | 12/1941 | Wilson | 260/309 |
| 2,268,273 | 12/1941 | Wilkes et al. | 8/142.5 |
| 2,355,837 | 8/1944 | Wilson | 260/309.6 |
| 2,694,021 | 11/1954 | Griffin | 117/139.5 |
| 2,728,972 | 1/1956 | Drummond et al. | 28/1 |
| 3,227,192 | 1/1966 | Griffiths | 139/420 |
| 3,664,855 | 5/1972 | Morrison et al. | 106/212 |
| 3,793,062 | 2/1974 | Elizer | 117/139.5 C |
| 3,793,065 | 2/1974 | Morrison et al. | 117/126 GQ |
| 3,869,308 | 3/1975 | Graham | 117/126 GB |
| 3,887,752 | 6/1975 | Elizer | 428/378 |
| 4,143,006 | 3/1979 | Workman | 260/17.4 ST |
| 4,166,872 | 9/1979 | Karpik et al. | 428/35 |
| 4,171,403 | 10/1979 | Haynes et al. | 428/392 |
| 4,197,349 | 4/1980 | Walser | 428/378 |
| 4,221,602 | 9/1980 | Walser | 106/211 |
| 4,233,046 | 11/1980 | Walser | 65/3 |
| 4,244,844 | 1/1981 | Molinier et al. | 260/9 |
| 4,259,190 | 3/1981 | Fahey | 252/8.6 |
| 4,296,173 | 10/1981 | Fahey | 428/378 |
| 4,397,913 | 8/1983 | Fahey | 428/369 |
| 4,681,805 | 7/1987 | Puckett | 428/391 |

OTHER PUBLICATIONS

Water-Vapor Absorption on Calcium-Boroaluminosilicate Glass Fiber: (Carman et al), Journal of Non Crystalline Solids, 120 (1990) 40-46.
The Manufacturing Technology of Continuous Glass Fibres; (K. L. Loewenstein), Elsevier Scientific Publishing Co. (1973) pp. 11-12.

Primary Examiner—Paul R. Michl
Assistant Examiner—LaVonda R. Dewitt
Attorney, Agent, or Firm—James B. Robinson; Kenneth J. Stachel

[57] ABSTRACT

An aqueous starch oil sizing composition is provided which produces improved processibility in woven and non-woven applications. The sizing combines a high amylose corn starch which has been derivatized with propylene oxide, with a low amylose highly crosslinked corn starch. The sizing also includes lubricants which may be oils or waxes and a lubricant which is the salt of a polyamino functional polyamide resin. Other emusifiers, humectants, lubricants, defoamers, and biocides may be present. The size also includes a silane coupling agent such as gamma glycidoxy propyl trimethoxy silane which can be hydrolyzed. Strands of glass fiber which have been treated with this size have shown a reduced tendency to shed the size from the strands, a reduction in the buildup of broken filaments or "fuzz" on processing equipment and reduced strand breakage.

15 Claims, No Drawings

STARCH OIL SIZING COMPOSITION AND GLASS FIBERS TREATED THEREWITH

This application is a continuation of application Ser. No. 07/828,046, filed Jan. 30, 1992 now abandoned.

FIELD OF THE INVENTION

The present invention is directed to starch oil type sizing composition and glass fibers that have been treated with the composition.

Glass fibers are produced by flowing molten glass via gravity through a multitude of small openings in a precious metal plate, called a bushing. During their formation these fibers are treated with a sizing composition which serves to protect the fibers from abrasion with each other. The term sizing means an aqueous chemical treatment which is applied to the glass fibers to impart certain properties as discussed below. After their formation and treatment, the fibers are gathered together into strands and wound on a "forming package". The forming packages are usually dried in either an oven or at room temperature to remove the moisture from the fibers. The fibers are then typically wound onto a bobbin via conventional textile twisting techniques such as a twist frame.

The sizing composition serves also to improve the performance of the fibers during further processing. Such further processing can include weaving of the fibers, which involves removing the fiber from the bobbin and guiding the fiber over or through a series of guide bars and other points of physical contact where wear could occur. Examples of the manifestation of such wear can be seen in the buildup of broken filaments or "fuzz" on the contact points, an increase in static electricity, poor quality of the woven product, as well as the shedding of the sizing from the fibers, or the breaking of the strand itself during weaving.

The strands of treated glass fiber may also be used in non woven applications such as the manufacture of fiber glass reinforced tape. In this application the strand can undergo abrasion and wear similar to that experienced in the woven applications as it is removed from the bobbin and processed.

It is an object of this invention to produce strands of glass fiber having a moisture reduced residue of a starch oil type sizing composition which results in improved processibility of the fibers with reduced fuzz production, reduced shedding, and greater strand integrity.

SUMMARY OF THE INVENTION

The objects of the invention are accomplished by strands of treated glass fibers where the treatment is an aqueous starch oil composition. There are two starches present, one of which is a highly crosslinked low amylose non-ionic corn starch. The second starch is a high amylose corn starch which has been derivatized with propylene oxide. Another component of the size in addition to the water, starch and oil is a silane coupling agent. Lubricants are present which increase the lubriciousness of the fibers. There may also be present emulsifiers, humectants, defoamers and a biocide to prevent organic growth on the treated fibers due to the presence of organic materials in the size such as the starches.

DETAILED DESCRIPTION OF THE INVENTION

One of the starches to be used in the present invention is a high amylose corn starch which has been modified with propylene oxide to produce hydroxyl propyl corn starch. A suitable material is sold by National Starch under the name Hi-set 369.

The second starch to be used is a highly crosslinked non-ionic low amylose corn starch. Such a starch is sold by American Maize under the name Amaizo 2213. High and low amylose in the context of this invention refers to starches with greater than or equal to 50% amylose and those with less than 50% amylose, respectively. The combined weight percent of the starches on a non-aqueous basis is in the range of about 50 to 60 wt %.

Examples of a non-ionic lubricant to be used in the present invention include waxes and vegetable oils hydrogenated to various degrees such as cotton seed oil, corn oil, soybean oil, etc. Any wax known to those skilled in the art for the treatment of glass fibers may be used, non-exclusive examples of which are paraffin wax, animal waxes, mineral waxes, petroleum derivative waxes, and synthetic waxes. The oil used in the preferred embodiment is a partially hydrogenated soybean oil. The wax used in the preferred embodiment is a paraffin wax.

Humecants which may be used in the present invention include polyalkylene polyols and polyoxyalkylene polyols. The humectant that is used in the alternative preferred embodiments is polyethylene glycol. A suitable polyethylene glycol is Carbowax 300 available from Union Carbide.

Any emulsifier known to those skilled in the art to be useful in emulsifying waxes and oils in water may be used. Non-exclusive examples are those which are non-ionic and have a hydrophilic/lipophilic balance (HLB) in the range of about 8 to 20 or any mixture with an HLB in this range. A suitable non-ionic emulsifier is Tween 81 which is sorbitan mono-oleate, with an HLB of about 10 and which is an ethylene oxide derivitive of sorbitol ester. The combined weight percent of the lubricants and emulsifier on a non-aqueous basis is in the range of about 23 to 33 wt % and the lubricants alone are between 22 and 28%.

The silane useful in this invention is an organic/inorganic compound used as a coupling agent between the predominantly organic size and the inorganic glass. Typical examples are gamma amino propyl triethoxy silane and gamma glycidoxy propyl trimethoxy silane. The silane may be hydrolized to some degree before use by reacting it with a suitable carboxylic acid. The weight percent of the silane coupling agent on a non-aqueous basis in the size is in the range of about 2 to 7 wt %.

Another lubricant which is present is a polyamino functional polyamide resin, a typical example of which is Versamid 140 from General Mills. Versamid 140 is the salt of a polyamino functional polyamide resin which is formed from the condensation reaction product of a polycarboxylic acid and a polyamine which has greater than two amine groups per molecule, and a carboxylic acid having 1 to 5 carbon atoms. The weight percent of the lubricant on a non-aqueous basis is in the range of about 6 to 12 wt %.

Yet another lubricant which may be present is a cationic one such as an amine salt of a fatty acid which has 4 to 26 carbon atoms and in all cases an even number of carbon atoms per molecule, or alkylimidazoline derivatives such as described in U.S. Pat. Nos. 2,200,815, 2,267,965, 2,268,273, and 2,355,837 hereby incorporated by reference. In the fatty acid amine salt lubricant the fatty acid moiety of the salt has between 12 and 22 carbon atoms. The amines useful for forming the salt are tertiary amines of substantially low molecular weight, for example, the alkyl groups attached to the nitrogen atom should be between 1 and 6 carbon atoms. Examples of such an amine salt of a fatty acid lubricant are the products available from Emery Industries, Inc including those designated 6717, 4046D, and 6760. The lubricant in the preferred embodiment is Emery 6717. A non-exclusive example of the alkylimidazoline derivative is the reaction product of stearic acid, tetraethylene pentamine and acetic acid which is available as Caton X.

Any biocide known to those skilled in the art to control orgasmic growth in sizing solutions and on the glass fibers treated therewith may be present. Non-exclusive examples of which are organotin bactericides and methylene thiocyanate bactericides and chlorinated compounds. A typical example is a chlorinated material designated as CL-2141 and marketed by Chemtreat.

A defoamer may also be used and any defoamer known to those skilled in the art for controlling foaming in starch oil treating solutions may be used. Mazu DF-136 is a proprietary polyether-triglyceride available from PPG Industries Inc..

In the preparation of the starches for the starch oil treating composition the starches are mixed together with water. The mixture is then cooked by any method known to those skilled in the art. The method used in the preferred embodiment is a jet cooker. The jet cooker injects steam directly into the starch and water mixture as it travels in a pipe. The downstream temperature is controlled at a specific value by the regulation of the addition rate of the steam to the mixture, The mixture is held at the cooking temperature for a particular time which allows the cooking to advance to the desired degree. Cooking is stopped by cooling the mixture in a water cooled heat exchanger. The starch and water mixture is then directed to a main mixing tank.

Other components are prepared separately and then added to the mixture of starches and water. The wax, oil and emusifier are mixed with demineralized water and emulsified by any suitable means. One method of emulsification is by circulating the mixture through a high pressure homogenizing pump and returning it to the same vessel. By this method the quality of the emulsion may be monitored until the mixture forms an emulsion with particles within a particular range. When the proper emulsion has formed, the pump discharge can be routed to the main mix tank holding the starches. Another method of emulsifying the mixture is to agitate it in a tank using a high shear mixer such as an Eppenbach mixer. Again, once the desired emulsion particle size is achieved, the mixture can be transferred to the main tank containing the starches.

The polyamino functional polyamide resin is mixed with water and a carboxylic acid, in this case acetic acid, and added to the main tank. The other lubricants must be mixed with water until dissolved and then it may be added to the main tank. The silane is prepared in a like manner; it is mixed in a separate tank with water and acetic acid and then added to the main tank. The biocide may be added directly to the main tank.

The sizing composition of this invention may be prepared by any other suitable method known to those skilled in the art and applied to glass fibers during their formation. The glass fibers may have any diameter capable of commercial manufacture, the most common being between 3 and 30 microns. The batch glass material from which the fibers are made can be any composition known to those skilled in the art. The most common batch material is that known as E-glass or 621 glass, though other batch compositions such as high or low boron glass are also suitable. The sizing composition may be applied and the fibers gathered together to form strands by any method known to those skilled in the art. The fibers are then dried in an oven or at room temperature such that the moisture content of the sizing on the fibers is reduced to less than 15 wt % of the glass and sizing.

PREFERRED EMBODIMENT OF THE INVENTION

The aqueous sizing composition was prepared from the ingredients listed in example A in table 1 to produce about 1000 gallons of the sizing mixture. Quantities are approximate. Alternate embodiments are also shown in Table 1 and are labeled as B, C and D.

TABLE 1

| Ingredient | A Amnt (lbs) | B Amnt (lbs) | C Amnt (lbs) | D Amnt(lbs) |
|---|---|---|---|---|
| Hi-set 369 | 82 | 297.6 | 279.3 | 279.3 |
| Amaizo 2213 | 232.6 | 33.1 | 51.4 | 51.4 |
| Paraffin wax | 68.3 | 132.3 | 0.0 | 0.0 |
| Eclipse 102 | 68.3 | 0.0 | 127.9 | 127.9 |
| Carbowax-300 | 0.0 | 37.5 | 37.5 | 37.5 |
| Tween 81 | 27.4 | 9.9 | 12.8 | 12.8 |
| Emery 6717 | 12.3 | 9.9 | 9.9 | 0.0 |
| Cation X | 0.0 | 0.0 | 0.0 | 23.1 |
| Versamid 140 | 45.6 | 43 | 33.1 | 33.1 |
| Acetic acid (Vers.) | 12.3 | 9.9 | 9.9 | 9.9 |
| Mazu DF 136 | 0.0 | 8.4 | 0.0 | 0.0 |
| A-187 | 24.0 | 19.8 | 20.9 | 20.9 |
| Acetic acid (A-187) | 1047 ml | 1047 ml | 1047 ml | 1047 ml |
| CL-2141 | 80 ml | 80 ml | 80 ml | 80 ml |

The aqueous composition was prepared by adding the starches to an agitated mixing or slurry tank to which was previously added 430 gallons of demineralized water.

Cooking of the starches takes place by pumping the starch mixture from the slurry tank through a jet cooker in which steam is injected directly into the starch mixture. The steam addition rate is controlled to give an exit temperature of about 255° F. (124° C.) and the exit pressure is controlled at approximately 27 psig. The residence or dwell time of the starch mixture at the cooking temperature is about 11 seconds to cook it and it then is cooled by passing it through a water cooled heat exchanger controlled to yield an exit temperature of about 170° F. (77° C.). The starch mixture is then directed to a main mix tank. Demineralized water in an Mount of 100 gallons is used to wash the slurry tank to thoroughly remove the raw starch from the tank as well as to flush any remaining starch from the Jet cooker. This wash water is flushed into the main mix tank also. In addition to the above method, any other method of cooking starch, such as open kettle cooking, known to those skilled in the art may be used to obtain the same degree of cooking as this method.

In the embodiments which contain polyethylene glycol, it is added to the main mix tank after the cooked starch.

About 5 gallons of demineralized water is then added to a separate emulsion tank, the temperature is set at about 175° F. (79° C.) and the paraffin wax is added. After the specified temperature has been reached and the wax has melted, the Eclipse 102 oil and the Tween 81 emusifier are added and the mixture is agitated for 30 seconds. For the alternative embodiments the preparation is very similar. For embodiment B only the wax is melted and then is mixed with the emulsifier and for embodiments C and D, no wax is added and the oil is mixed with the emulsifier. An additional 36 gallons of about 175° F. (79° C.) demineralized water is then added and the mixture is circulated through an homogenizing pump to emulsify the mixture. The pump discharge is recirculated to the same tank from which it takes suction. Once the ingredients have been emulsified to the point where the particle size is in the range of about 1 to 3 microns, the pump discharge is directed to the main mix tank.

To another tank, 30 gallons of approximately 145° F. (63° C.) demineralized water is added and agitation is begun. The Emery 6717 lubricant is then added and agitation is continued until it dissolves, at which point the mixture is transferred to the main mix tank.

To another tank, 30 gallons of about 145° F. (63° C.) demineralized water is added and agitation is begun. Acetic acid in the amount shown above is added and then the Versamid 140 lubricant is added and the mixture agitated until the Versamid dissolves. The mixture is then transferred to the main mix tank.

To another tank, 45 gallons of approximately 60° to 80° F. (16° to 27° C.) demineralized water is added and agitation begun. The indicated amount of acetic acid is then added. The A-187 silane is added at a rate not to exceed 1 gpm and the solution is agitated until it clears; usually at least 5 minutes. The mixture is then added to the main mix tank.

The CL-2141 biocide can be added directly to the main mix tank as can the defoamer in embodiment B. Demineralized water is then added to the main mix tank in an amount sufficient to bring the total amount of sizing prepared to about 1000 gallons, and agitation is continued for an additional 10 minutes.

The sizing composition was applied to the fibers immediately after formation below the bushing using an applicator. An example of an applicator suitable for this application is shown in U.S. Pat. No. 2,728,972, hereby incorporated by reference. After the application of the sizing, the fibers are gathered together to form a strand composed of multiple fibers. The strands used in this application contain 200 fibers though other multiples of fibers could be used. The fibers used in this application are preferably of G diameter (10 microns) though other diameters may be used. The strands are then wound onto a forming package placed on a winder which rotates at a speed in the range of about between 4,000 and 6,000 rpm.

After the forming package has reached its capacity it is removed from the winder and an empty package put in its place to begin the process again. The forming package is then dried in an oven or at room temperature to remove the water from the package to a point where the moisture content is below 15 wt % of the glass. The forming package is then mounted on a twist frame machine and the glass fiber strands are transferred to a bobbin. During this step a slight twist is imparted to the strand.

Many hundreds of thousands of yards of treated glass fiber strands of the present invention have been woven by processors with good results in strand integrity, shedding characteristics and low fuzz production.

I claim:

1. An aqueous sizing composition for glass fibers comprising:
   a mixture of an hydroxyl propyl corn starch which has been formed by the reaction of a high amylose corn starch with propylene oxide, and a highly crosslinked low amylose non-ionic corn starch, said starches having a combined weight percentage of 50–60% of the sizing composition on a non-aqueous basis;
   a lubricating mixture selected from the group consisting of fatty di or triglycerides and waxes, fatty diglycerides and humectants, fatty diglycerides, waxes and humectants, or waxes and humectants, wherein the triglyceride, where present, is in a ratio to the other lubricants of at least 1:1 on a weight basis;
   a second lubricant which is the salt of a polyamino functional polyamide resin, said polyamino functional polyamide resin salt being formed from the condensation reaction product of a polycarboxylic acid and a polyamine, said polyamine having greater than two amine groups per molecule, and the carboxylic acid having 1 to 5 carbon atoms;
   at least one coupling agent selected from the group consisting of hydrolyzed silanes and non-hydrolyzed silanes, and mixtures thereof; and
   water in an mount sufficient to apply the solution to glass fibers.

2. The size of claim 1 further comprising at least one emulsifier in an effective mount to produce an emulsion in water of a non-ionic lubricant selected from the group consisting of fatty di or triglycerides and waxes.

3. The size of claim 2 wherein the emulsifier has an HLB of about between 8 and 20 and is an ethylene oxide derivative of sorbitol ester.

4. The size of claim 1 further comprising a cationic lubricant in an effective cationic lubricating amount.

5. The size of claim 4 wherein the cationic lubricant is selected from the group consisting of fatty acid amine salts and alkyl imidazoline derivatives.

6. The size of claim 1 further comprising a biocide in an amount sufficient to inhibit organic growth in said sizing composition.

7. The size of claim 1 wherein the non-ionic lubricant is selected from the group consisting of partially hydrogenated soybean oil and paraffin wax, or a mixture thereof.

8. The size of claim 1 wherein the humectant is polyethylene glycol.

9. The size of claim 1 wherein the silane coupling agent is selected from the group consisting of gamma glycidoxy propyl trimethoxy silane and gamma amino propyl trimethoxy silane or a mixture thereof.

10. The size of claim 9 further comprising a carboxylic acid in an mount sufficient to hydrolyze said silane.

11. The size of claim 1 further comprising a defoamer in an amount sufficient to decrease the amount of foam in said size.

12. The size of claim 1 which is present on glass fibers in a moisture reduced amount of between 0.5 and 2.5 weight percent of the glass as measured on a loss on ignition basis.

13. An aqueous sizing composition for glass fibers comprising:
- between 50 and 60 weight percent on a non-aqueous basis of a mixture of two starches, a first starch being an hydroxyl propyl corn starch which has been formed by the reaction of propylene oxide with a high amylose corn starch, and a second starch being a highly crosslinked low amylose non-ionic corn starch;
- between 23 and 33 weight percent of a non-aqueous basis of a lubricating mixture selected from the group consisting of fatty triglycerides and waxes, or waxes and humectants, wherein the triglyceride, where present, is in a ratio to the other lubricants of at least 1:1 on a weight basis;
- between 6 and 12 weight percent of a non-aqueous basis of a second lubricant which is the salt of a polyamino functional polyamide resin, said polyamino functional polyamide resin salt being formed from the condensation reaction product of a polycarboxylic acid and a polyamine, said polyamine having greater than two amine groups per molecule, and the carboxylic acid having 1 to 5 carbon atoms;
- between 2 and 7 weight percent on a non-aqueous basis of at least one coupling agent selected from the group consisting of hydrolyzed silanes and non-hydrolyzed silanes, and mixtures thereof; and
- water in an amount sufficient to apply the solution to glass fibers.

14. The size of claim 13 further comprising a cationic lubricant in an effective cationic lubricating amount.

15. The size of claim 14 wherein the cationic lubricant is selected from the group consisting of fatty acid amine salts and alkyl imidazoline derivatives.

* * * * *

UNITED STATES PATENT AND TRADEMARK OFFICE
CERTIFICATE OF CORRECTION

PATENT NO. : 5,334,639
DATED : August 2, 1994
INVENTOR(S) : William B. Rice

It is certified that error appears in the above-indentified patent and that said Letters Patent is hereby corrected as shown below:

Claim 10, column 6, line 63, delete the word "mount" and insert --amount--.

Signed and Sealed this

Sixth Day of August, 1996

Attest:

BRUCE LEHMAN

Attesting Officer

Commissioner of Patents and Trademarks